No. 783,310. PATENTED FEB. 21, 1905.
C. J. REED.
GEAR MECHANISM FOR EXPANSIBLE PULLEYS.
APPLICATION FILED MAY 25, 1904.
2 SHEETS—SHEET 1.
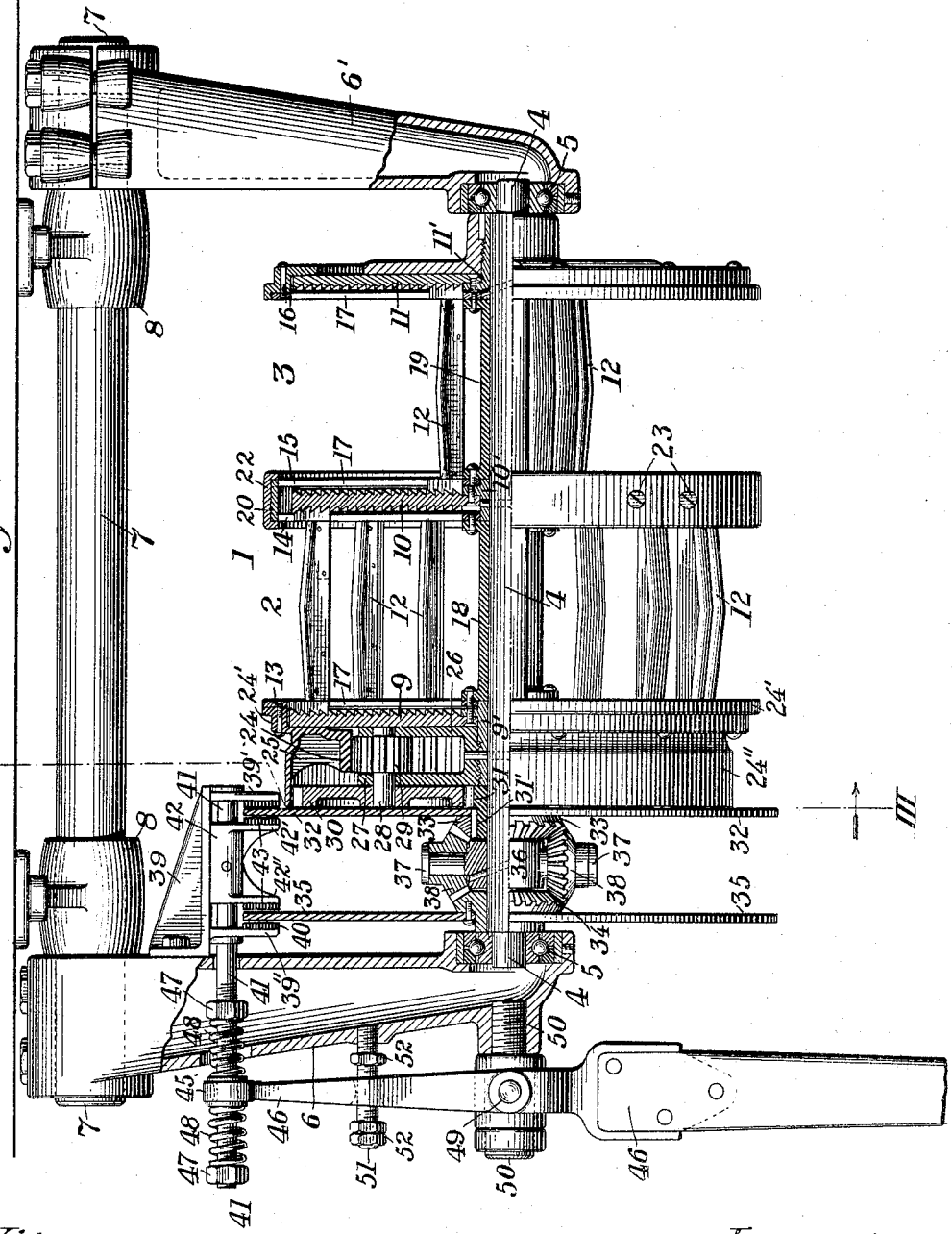
Witnesses:
R. A. Balderson.
J. B. Hill.
Inventor:
Charles J. Reed,
by Jymes & Townsend,
Att'ys.

No. 783,310. PATENTED FEB. 21, 1905.
C. J. REED.
GEAR MECHANISM FOR EXPANSIBLE PULLEYS.
APPLICATION FILED MAY 25, 1904.
2 SHEETS—SHEET 2.
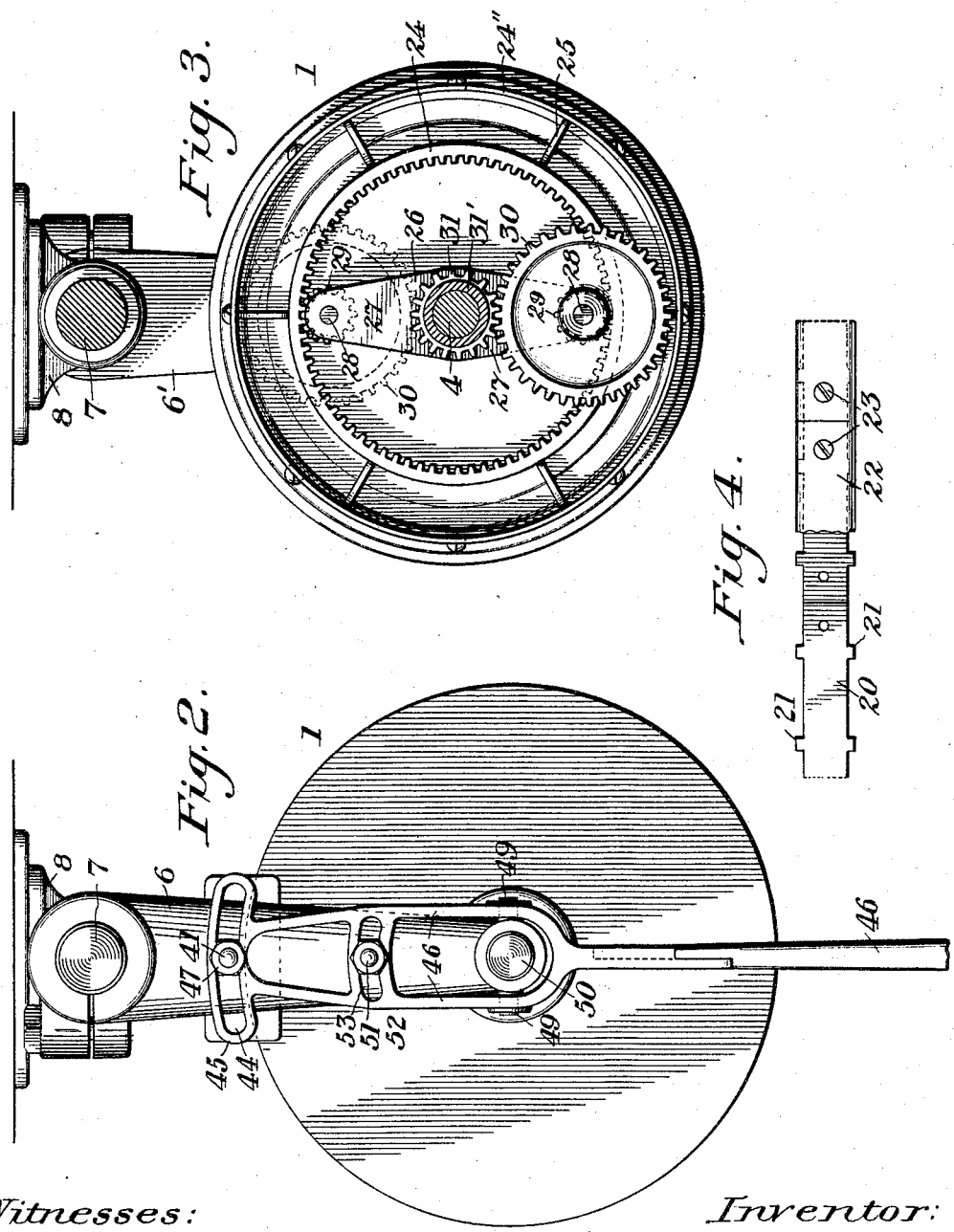
Witnesses:
R A Baldwin
J. B. Hill
Inventor:
Charles J. Reed
by Byrnes & Townsend
Attys.

No. 783,310.

Patented February 21, 1905.

UNITED STATES PATENT OFFICE.

CHARLES J. REED, OF PHILADELPHIA, PENNSYLVANIA, ASSIGNOR TO REED MORRILL ELECTRIC CO., A CORPORATION OF PENNSYLVANIA.

GEAR MECHANISM FOR EXPANSIBLE PULLEYS.

SPECIFICATION forming part of Letters Patent No. 783,310, dated February 21, 1905.

Application filed May 25, 1904. Serial No. 209,722.

*To all whom it may concern:*

Be it known that I, CHARLES J. REED, a citizen of the United States, residing at Philadelphia, in the county of Philadelphia and State of Pennsylvania, have invented certain new and useful Improvements in Gear Mechanism for Expansible Pulleys, of which the following is a specification.

In United States Patents Nos. 758,474 and 758,561, granted to me April 26, 1904, I have shown and claimed a mechanism for transmitting power from a driving to a driven shaft and enabling the speed of the driven shaft to be varied with reference to that of the driving-shaft, comprising a double pulley placed between and belted to pulleys on the driving and the driven shafts. Each drum of the double pulley consists of a set of radially-adjustable rim-sections, the ends of which pass through radial slots in circular guide-plates and have teeth entering spiral grooves in circular adjusting-disks. Differential-gear mechanism is provided to rotate the guide-plates with reference to the adjusting-disks, thereby simultaneously moving either set of rim-sections inwardly and the other outwardly, contracting one drum and expanding the other. The shaft of the double pulley is carried by rock-arms to compensate for changes in the working length of the belts, by which it receives and transmits power.

The present invention relates to expansible pulleys, especially of the type shown in these patents, and specifically to gear mechanism for rotating the guide-plates with reference to the adjusting-disks, and thereby shifting the rim-sections.

Referring to the accompanying drawings, Figure 1 is a side elevation of the double pulley with parts above a horizontal axial plane in vertical axial section. Fig. 2 is an end elevation of the pulley shown in Fig. 1 looking toward the right. Fig. 3 is a transverse vertical section on the line III III of Fig. 1, and Fig. 4 is a detail view of means for rigidly connecting the adjacent guide-plates of the two pulley-drums.

The double pulley 1, comprising drums 2 and 3, is carried by a shaft 4, journaled in ball-bearings 5 in the lower ends of depending rock-arms 6 6', which are rigidly clamped on a rock-shaft 7, journaled in fixed bearings 8. The pulley has three spirally-grooved rim-section-adjusting disks 9 10 11, carried by and screwed to short sleeves 9' 10' 11', which are pinned to the shaft. The disks 9 and 10 are spaced apart to receive between them one set of rim-sections 12 and the disks 10 and 11 are spaced apart to receive between them the other set of rim-sections. The grooves in the disks 9 and 11 are cut in a clockwise direction from the center to the circumference. The grooves on both faces of the disk 10 are cut in a contra-clockwise direction from the center to the circumference. Between and closely adjacent to the grooved faces of the adjusting-disks are the rim-section-guiding plates 13 14 15 16, which have radial slots 17, receiving the ends of the rim-sections. The plates 13 14 are rigidly secured to the flanged ends of a sleeve 18, which is revolubly supported on the pulley-shaft 4 between the adjusting-disks 9 10. The plates 15 16 are rigidly secured to the flanged ends of a sleeve 19, which is revolubly supported on the shaft between the adjusting-disks 10 11. The adjacent guide-plates 14 15 are rigidly secured together by the parts shown in detail in Fig. 4, comprising a circular rim 20, having lateral projections 21, which enter the outer ends of each radial slot 17, and a circular channel-bar 22, which incloses the rim 20 and is secured thereto by screws 23. Rotation of the guide-plate 13 thus simultaneously rotates the other guide-plates.

The improved gear mechanism for rotating the guide-plates comprises an internally-toothed gear 24, which has a peripheral flange 24' loosely inclosing the edge of the adjusting-disk 9 and screwed to the edge of the guide-plate 13. The gear 24 also has a thin rim portion 24'', supported by radial webs 25, to inclose certain gears. A member 26, having two pairs of arms 27, which extend radially outward in opposite directions from the shaft, is screwed on the collar 9' of the adjusting-disk 9 and pinned to the pulley-shaft 4. A short shaft 28 is journaled in the outer end of each pair of arms 27 and carries between them a pinion 29, which engages the gear 24. The projecting outer end of the shaft 28 carries a gear 30, which engages a gear 31, having a hub 31', which revolves loosely on the pulley-shaft. A circular friction-disk 32 and a bevel-gear 33 are keyed on the hub 31'. Another bevel-gear, 34, facing and spaced away from gear 33, revolves loosely on the pulley-shaft and carries a friction-disk 35. A collar 36, carrying two stub-shafts 37, is pinned on the pulley-shaft between the bevel-gears 33 34. Bevel-pinions 38, between and meshing with the bevel-gears 33 34, are carried by the shafts 37.

A bracket 39 is bolted to and projects inward from the upper end of the rock-arm 6 and carries two depending apertured lugs 39' 39", having friction-faces 40, preferably of leather, closely adjacent to the outer edges of the friction-disks 32 35. A horizontal shaft 41 is arranged to reciprocate in the apertures of the lugs 39' 39" and carries a member 42, which has two depending lugs 42' 42", with friction-faces 43, preferably of leather, arranged between and in proximity to the adjacent faces of the friction-disks 32 35 and respectively opposite the faces 40 of the bracket-lugs. The threaded outer end of the shaft 41 passes through a slot 44 in the upper end 45 of a hand-lever 46 and carries two nuts 47, between which are two short helical springs 48, bearing against the opposite sides of the lever end 45. The lever 46 surrounds and is journaled on pivots 49, which project horizontally from the opposite sides of a piece 50, which is screwed into the lower end of the rock-arm 6. A pin 51, carrying stop-nuts 52, is screwed into the rock-arm 6 above the piece 50 and passes through a slot 53 in the lever 46. The slots 44 and 53 in the hand-lever are arcs of circles whose center is the pulley-shaft, thus permitting the lever to hang vertically notwithstanding changes in the position of the pulley and rock-arms due to the varying length of the belts which run on the two drums of the pulley.

In Fig. 1 the rim-sections 12 of the drum 2 are shown in their outermost position and those of the drum 3 in their innermost position. When the hand-lever 46 hangs free, the friction-disks 32 35 and the bevel gears and pinions 33 34 38 rotate idly with the pulley-shaft. Assuming that the operator is standing at the lever, that the double pulley as viewed by him is rotating in a clockwise direction, and that he desires to increase the speed of the driven shaft belted to the drum 3, he seizes the depending end of the lever and pulls it outward, thereby forcing the shaft 41 inward and pushing the lug 42' against the friction-disk 32. This disk being of sheet-steel is forced against the face of the fixed lug 39' and is thus frictionally clamped. The disk 32 and gear 31 are thereby held from rotation, while the pulley-shaft 4 rotates within them, carrying the upper arms 27 to the right. The upper gear 30 then rolls to the right on the pinion 31, rotating the shaft 28, pinion 29, and finally the internal gear 24 and the guide-plates in a clockwise direction relatively to the pulley-shaft or at an angular speed greater than that of the pulley-shaft. The rim-sections are thus shifted to the right, and those of the drum 2 travel inward along the spiral grooves of the adjusting-disks, while those of the drum 3 travel outward. When the driven shaft has been brought to the desired speed, the lever 46 is released and the friction-disk 32 and guide-plates resume their normal speed. The rim-sections of the drum 2 are moved outward and those of the drum 3 inward by pushing the lower end of the hand-lever inward and clamping the friction-disk 35 between the lugs 39" and 42". The bevel-pinions 38 then roll upon the gear 34 and rotate the gear 33 and guide-plates in a contra-clockwise direction upon the pulley-shaft. When the rim-sections are thrown outward or inward against the ends of the radial slots in the guide-plates and these plates are thus prevented from further rotation, the friction-disk, which has been clamped to effect the adjustment, is forcibly set in rotation, slipping between the leather faces of the clamp-lugs. The springs 48 and stops 52 prevent the application of excessive pressure to the friction-disks.

While the gear mechanism has been shown and described in connection with a double-drum pulley, it is obvious that it may be advantageously used in a single expansible pulley or in one having more than two drums.

I claim—

1. In an expansible pulley, a shaft carrying a fixed pulley member and a revoluble pulley member, a loose pinion on said shaft, a gear on said revoluble member, and gears journaled in said fixed member and engaging said pinion and the gear on said revoluble member, as set forth.

2. In an expansible pulley, a shaft carrying a fixed pulley member and a revoluble pulley member, a loose pinion on said shaft, an internal gear on said revoluble member, a short shaft journaled in said fixed member, and, fixed on said short shaft, a gear meshing with said loose pinion and a pinion meshing with said internal gear, as set forth.

3. In an expansible pulley, a shaft carrying a fixed pulley member and a revoluble pulley member, a loose pinion on said shaft, a gear on said revoluble member, gears journaled in said fixed member and engaging said pinion and the gear on said revoluble member, and means for rotating said pinion in either direction, as set forth.

4. In an expansible pulley, a shaft carrying a fixed pulley member and a revoluble pulley member, a loose pinion on said shaft, a gear on said revoluble member, gears journaled in said fixed member and engaging said pinion and the gear on said revoluble member, a disk fixed on said pinion, and means for clamping said disk, as set forth.

5. In an expansible pulley, a shaft carrying a fixed pulley member and a revoluble pulley member, a loose pinion on said shaft, a gear on said revoluble member, gears journaled in said fixed member and engaging said pinion and the gear on said revoluble member, a disk fixed on said pinion, a second disk loosely mounted on said shaft, gears for rotating said disks in opposite directions, and means for clamping either disk, as set forth.

6. In an expansible pulley, a shaft carrying a fixed pulley member and a revoluble pulley member, a loose pinion on said shaft, a gear on said revoluble member, gears journaled in said fixed member and engaging said pinion and the gear on said revoluble member, a disk fixed on said pinion, a second disk loosely mounted on said shaft, adjacent bevel-gears on said disks, a bevel pinion or pinions carried by said shaft and engaging both bevel-gears, and means for clamping either disk, as set forth.

7. In an expansible pulley, a shaft carrying a fixed pulley member and a revoluble pulley member, a loose pinion on said shaft, a gear on said revoluble member, gears journaled in said fixed member and engaging said pinion and the gear on said revoluble member, a disk fixed on said pinion, a second disk loosely mounted on said shaft, adjacent bevel-gears on said disks, a bevel pinion or pinions carried by said shaft and engaging both bevel-gears, and friction-clamps for engaging either disk, as set forth.

8. In an expansible pulley, a shaft carrying a fixed pulley member and a revoluble pulley member, a loose pinion on said shaft, a gear on said revoluble member, gears journaled in said fixed member and engaging said pinion and the gear on said revoluble member, a disk fixed on said pinion, a second disk loosely mounted on said shaft, adjacent bevel-gears on said disks, a bevel pinion or pinions carried by said shaft and engaging both bevel-gears, friction-clamps for engaging either disk, and a hand-lever having an elastic connection with said clamps, as set forth.

9. An expansible pulley, comprising adjustable rim-sections, a shaft carrying a fixed member and a revoluble member for adjusting and guiding said rim-sections, rock-arms supporting said shaft, a loose pinion on said shaft, a gear on said revoluble member, and gears journaled in said fixed member and engaging said pinion and the gear on said revoluble member, as set forth.

10. An expansible pulley, comprising adjustable rim-sections, a shaft carrying a fixed member and a revoluble member for adjusting and guiding said rim-sections, rock-arms supporting said shaft, a loose pinion on said shaft, a gear on said revoluble member, gears journaled in said fixed member and engaging said pinion and the gear on said revoluble member, a disk fixed on said pinion, a second disk loosely mounted on said shaft, gears for rotating said disks in opposite directions, clamps for engaging either disk, and a hand-lever pivoted on one of said rock-arms and connected to said clamps, as set forth.

11. An expansible pulley, comprising adjustable rim-sections, a shaft carrying a fixed member and a revoluble member for adjusting and guiding said rim-sections, rock-arms supporting said shaft, means for operating said revoluble member, and a hand-lever pivoted on one of said rock-arms and connected to said operating means, as set forth.

12. An expansible pulley, comprising adjustable rim-sections, a shaft carrying a fixed member and a revoluble member for adjusting and guiding said rim-sections, rock-arms supporting said shaft, means including a friction disk and clamp for operating said revoluble member, a hand-lever pivoted on one of said rock-arms and elastically connected to said clamp, and a stop for said hand-lever, as set forth.

In testimony whereof I affix my signature in presence of two witnesses.

CHARLES J. REED.

Witnesses:
EUGENE A. BYRNES,
ROBT. B. FLETCHER.